(12) United States Patent
Betting et al.

(10) Patent No.: US 8,915,990 B2
(45) Date of Patent: Dec. 23, 2014

(54) SYSTEM AND METHOD FOR REMOVING HYDROGEN SULFIDE FROM A NATURAL GAS STREAM

(75) Inventors: Marco Betting, Rijswijk (NL); Robert Petrus van Bakel, Rijswijk (NL); Cornelis Antonie Tjeenk Willink, Rijswijk (NL)

(73) Assignee: Twister B.V. (NL)

( * ) Notice: Subject to any disclaimer, the term of this patent is extended or adjusted under 35 U.S.C. 154(b) by 958 days.

(21) Appl. No.: 13/056,304

(22) PCT Filed: Jul. 30, 2009

(86) PCT No.: PCT/NL2009/050471
§ 371 (c)(1),
(2), (4) Date: Apr. 18, 2011

(87) PCT Pub. No.: WO2010/014008
PCT Pub. Date: Feb. 4, 2010

(65) Prior Publication Data
US 2011/0185633 A1  Aug. 4, 2011

(30) Foreign Application Priority Data
Jul. 30, 2008  (WO) ................ PCT/NL2008/050522

(51) Int. Cl.
B01D 47/00 (2006.01)
B01D 53/14 (2006.01)
C10L 3/10 (2006.01)
B01D 53/00 (2006.01)

(52) U.S. Cl.
CPC . *C10L 3/10* (2013.01); *C10L 3/102* (2013.01); *B01D 53/1468* (2013.01); *B01D 2257/304* (2013.01); *B01D 53/002* (2013.01); *B01D 2258/06* (2013.01)
USPC .................. 95/219; 95/235; 96/303; 96/306; 96/311; 96/314; 96/319

(58) Field of Classification Search
None
See application file for complete search history.

(56) References Cited

U.S. PATENT DOCUMENTS

| | | | |
|---|---|---|---|
| 3,630,666 A | 12/1971 | Kunkel | |
| 3,852,408 A * | 12/1974 | Ewan et al. | ................. 423/243.1 |
| 3,852,409 A * | 12/1974 | Martin et al. | ............ 423/243.08 |
| 3,912,469 A * | 10/1975 | Ewan et al. | ...................... 96/311 |
| 4,141,701 A * | 2/1979 | Ewan et al. | ...................... 95/217 |
| 4,293,521 A * | 10/1981 | Isahaya et al. | ................... 422/62 |
| 2002/0189443 A1 | 12/2002 | McGuire | |
| 2002/0194988 A1 | 12/2002 | Betting et al. | |
| 2003/0000698 A1 | 1/2003 | Lecomte | |

FOREIGN PATENT DOCUMENTS

| | | |
|---|---|---|
| WO | 2006089948 | 8/2006 |
| WO | 2007/031476 | 3/2007 |
| WO | 2009/002174 | 12/2008 |

* cited by examiner

*Primary Examiner* — Duane Smith
*Assistant Examiner* — Phillip Shao
(74) *Attorney, Agent, or Firm* — Meyer IP Law Group

(57) ABSTRACT

A refining system for refining a feed gas comprising hydrocarbons and hydrogen sulfide having a first concentration of hydrogen sulfide including a first part for producing a stream of a first processed feed gas, and a second part for producing a second stream of a second processed feed gas from the stream of the first processed feed gas using a separation process for $H_2S$ removal.

16 Claims, 5 Drawing Sheets

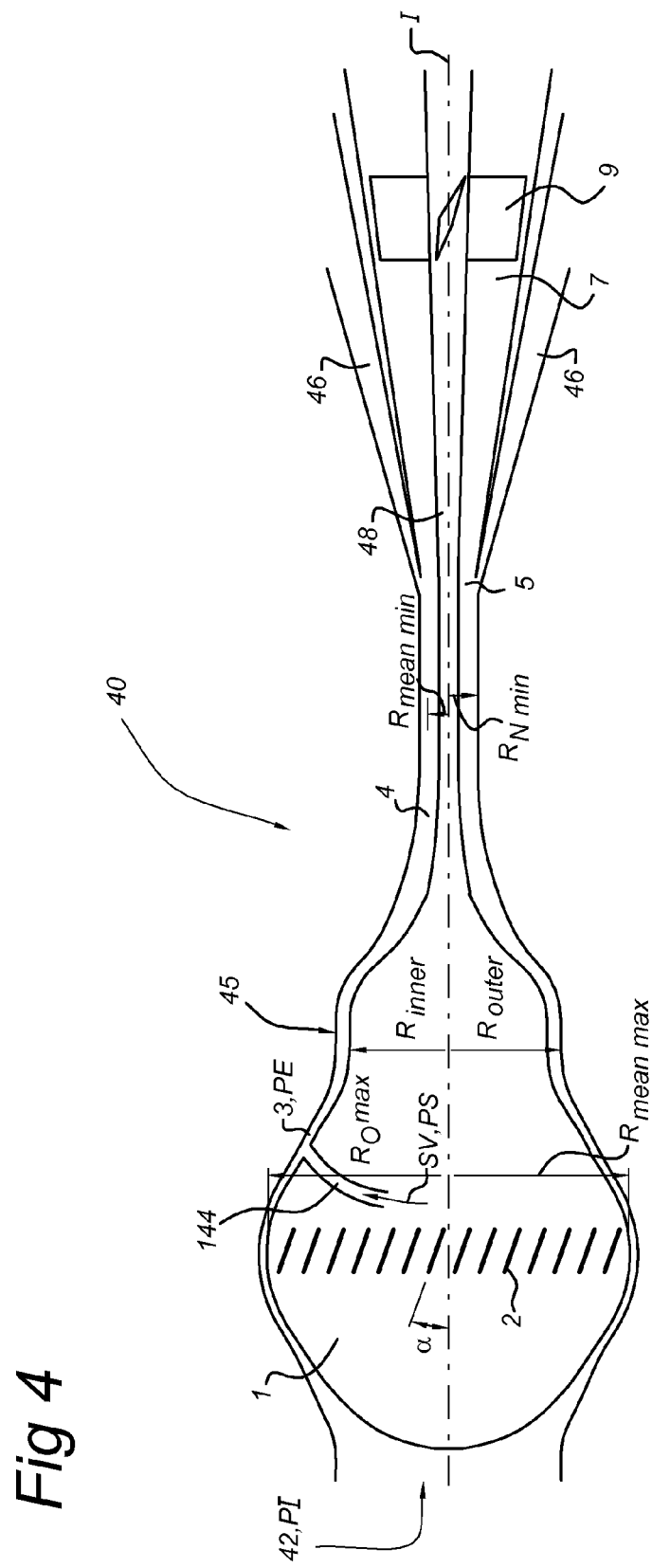

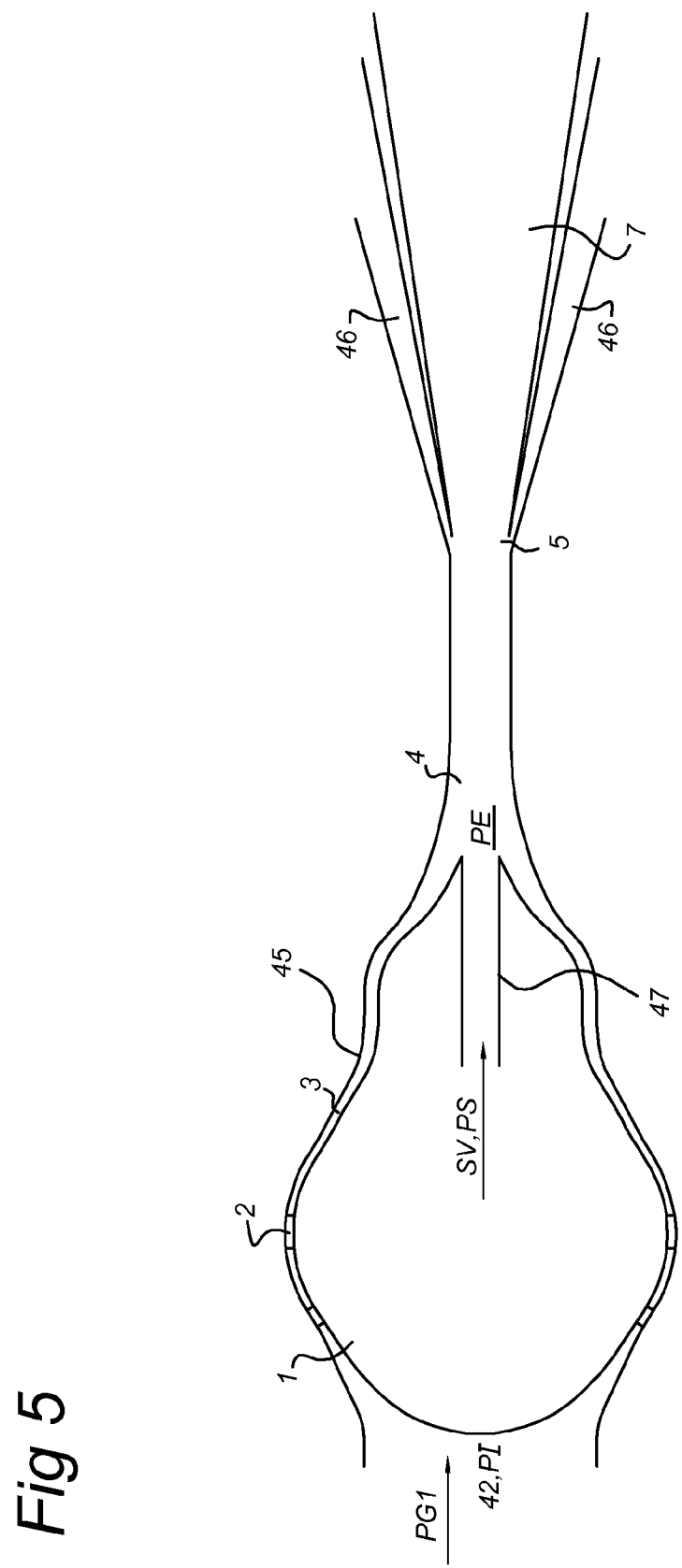

SYSTEM AND METHOD FOR REMOVING HYDROGEN SULFIDE FROM A NATURAL GAS STREAM

TECHNICAL FIELD

The invention relates to a system for removing hydrogen sulfide from a gas stream. Also, the invention relates to a method for removing hydrogen sulfide from a gas stream. Moreover, the invention relates to a cyclonic separator.

STATE OF THE ART

Natural gas as obtained from gas- or oilfields comprises methane gas that is typically mixed with additional components such as heavier hydrocarbons (e.g., ethane, propane, butane, and pentane) and others such as carbon dioxide, nitrogen, helium, mercury and hydrogen sulfide ($H_2S$).

In unrefined natural gas from many fields the amount of hydrogen sulfide, which is poisonous for living beings, may be relatively high. Amounts of about 30 mol % hydrogen sulfide can be routinely observed.

For many applications, it is desirable to reduce the hydrogen sulfide amount to relatively low levels, e.g., to a level of a few ppm (parts-per-million).

In the prior art, methods have been disclosed which aim to reduce the hydrogen sulfide level of natural gas. Such methods are often based on the well-known Amine absorption process and a subsequent Claus process, in which elementary sulfur is recovered from hydrogen sulfide. The sulfur recovery from a Claus process is described by the overall reaction:

$$2H_2S+O_2 \rightarrow 2S+2H_2O \qquad [1]$$

Amine absorption processes in their basic form allow recovery of hydrogen sulfide down to a residual level of about 10 ppm of hydrogen sulfide in the natural gas. Furthermore, the hydrogen sulfide enriched tail gas evolving from the desorption of the Amine absorption fluid is treated in the Claus process, where the sulfur is recovered in its solid state and is often stored in a landfill or waste dump. From an environmental viewpoint such an open storage is undesirable.

From U.S. Pat. No. 6,375,797 a process is known which reduces the level of hydrogen sulfide by a fractionation process for low temperature $H_2S$ removal. This so-called SPREX scheme is operating a fractionation column fed with pre-cooled gas at a feed temperature of 25-30° C. The overhead gas—containing predominantly methane and $H_2S$—is cooled down to approx −30° C. with a chilling device. The liquid condensing in the chilling device, which predominantly consists of $H_2S$, is fed back to the top tray of the column as reflux. This $H_2S$ reflux dissolves the majority of the water entering the column. By using this $H_2S$ reflux as desiccant, hydrates can be avoided even when the column top temperature of the fluid is operated at −5° C. at a pressure of ~80 bar. The $H_2S$ enriched liquid stream leaving the bottom of the column is thereafter pumped into the gas reservoir, thereby avoiding costly, large scale Amine absorption towers and Claus process reactors as well as avoiding operational costs associated with the disposal of huge amounts of elementary sulfur.

The SPREX process as disclosed in U.S. Pat. No. 6,735,979 is designed as a bulk $H_2S$ removal system, hence post-treatment with Amine absorbers remains necessary. The $H_2S$ recovery rate is about 60-70% leaving still substantial amounts of $H_2S$ in the produced gas stream (10-25 mol %). A further increase of the $H_2S$ recovery would require lower top temperatures hence larger chillers. Unfortunately, the incremental investment saving of the smaller amine and Claus plant do not outweigh the incremental cost of these increasingly larger chillers.

SUMMARY

It is an object to enhance the $H_2S$ recovery and reduce the $H_2S$ level of the produced gas stream to lower levels. This object is achieved by a refining system according to the present invention.

According to an aspect of the invention, there is provided a method for refining a feed gas comprising hydrocarbons and hydrogen sulfide having a first concentration of hydrogen sulfide, comprising:
producing a stream of a first processed feed gas, and
producing a second stream of a second processed feed gas from the stream of the first processed feed gas, using a separation process for $H_2S$ removal by a cyclonic separator, wherein the cyclonic separator comprises a first inlet, a second inlet and is arranged for
receiving at the first inlet the stream of first processed feed gas, —
receiving at a distal end of the second inlet a flow of additive component, the additive component being a solvent for hydrogen sulfide, —
spraying from the second inlet the flow of additive component into the first processed feed gas stream so as to form a mixture of sprayed additive and first processed feed gas, and
creating at a first outlet a first flow of the second processed feed gas and at a second outlet a second flow of substantially hydrogen sulfide containing liquid, the second processed feed gas having a second concentration of hydrogen sulfide, the second concentration being relatively lower than the concentration of hydrogen sulfide of the first processed feed gas, received at the first inlet.

According to an aspect of the invention, there is provided a method as described above, wherein the additive component is a non-aqueous fluid which comprises as constituent one or more of the following chemical groups, i.e., an alcohol (e.g. methanol, ethanol), a diol, (e.g. ethylene glycol, dimethyl ether of polyethylene glycol), an ionic liquid, a dipolar aprotic solvent (e.g. Sulpholane).

According to an aspect of the invention, there is provided a method as described above, wherein the production of the stream of the first processed feed gas comprises removing hydrogen sulfide from the feed gas by a $H_2S$ bulk removal stage.

According to an aspect of the invention, there is provided a method as described above, wherein the cyclonic separator comprises in a housing a swirl inlet device comprising a pear-shaped central body which is arranged inside the housing coaxial to a central axis of the separator; a space region being arranged in between the central body and the housing for an annular flow path, and wherein the second inlet is located at the periphery of the central body, so as to introduce the additive component into the annular flow path.

According to an aspect of the invention, there is provided a method as described above, comprising generating the spray of additive component in the annular flow path by the second inlet being arranged with at least one nozzle.

According to an aspect of the invention, there is provided a method as described above, wherein the at least one nozzle of the second inlet is located in a wall of the housing at the periphery of central body, for introduction of the additive component into the gas stream in a space region between the outer wall of the housing and the central body.

According to an aspect of the invention, there is provided a method as described above, wherein the at least one nozzle of the second inlet is located in a peripheral wall of the central body, for introduction of the additive component into the gas stream in a space region between the outer wall of the housing and the central body.

According to an aspect of the invention, there is provided a method as described above, wherein the cyclonic separator further comprises a tubular throat portion downstream of the central body, and the at least one nozzle of the second inlet is located on the downstream side of the central body, directed towards the tubular throat portion, in which position and direction of the second inlet substantially coincide with the central axis.

According to an aspect of the invention, there is provided a method as described above, wherein the additive component comprises as constituent at least one of a sulfolane and an ionic liquid.

According to an aspect of the invention, there is provided a method as described above, wherein the ionic liquid comprises at least one of a 1-butyl-3-methylimidazolium hexafluorophosphate and a 1-hexyl-3-methylimidazolium-bis(trifluoromethylsulfonyl)imide.

According to an aspect of the invention, there is provided a method as described above, comprising creating a spray with particle density of at least about $10^8/m^3$ by the second inlet.

According to an aspect of the invention, there is provided a method as described above, comprising creating by the second inlet spray particles with a size selected from one of a range from about 50 µm to about 0.2 µm, and a range from about 20 µm to about 1 µm.

According to an aspect of the invention, there is provided a method as described above, comprising the:

receiving by a liquid separator comprising a flow inlet, a first, second and third liquid outlet, at the flow inlet the second flow of a substantially hydrogen sulfide containing fluid;

separating the second flow of the substantially hydrogen sulfide containing fluid in a first, second and third component, the first component being second processed feed gas, the second component being a first liquid hydrogen sulfide and the third component being a mixture of liquid hydrogen sulfide mixed and additive component;

outputting at the first outlet the second processed feed gas to an outlet part;

outputting at the second outlet the first liquid hydrogen sulfide components to a drain part, and outputting at the third outlet the mixture of liquid hydrogen sulfide and additive component.

According to an aspect of the invention, there is provided a method as described above, further comprising receiving by a further liquid separator the mixture of liquid hydrogen sulfide and additive component from the second liquid separator and separating by the further liquid separator the additive component from the liquid hydrogen sulfide, the further liquid separator comprising an inlet for receiving the mixture of liquid hydrogen sulfide and additive component, a first outlet for outputting a flow of gaseous hydrogen sulfide components and a second outlet for outputting of additive component, the second outlet being connected to the second inlet of the cyclonic separator.

According to an aspect of the invention, there is provided a method as described above, further comprising:

in an oxidation unit, the oxidation unit having an inlet being connected to the first outlet of the further liquid separator and having an outlet being connected to the drain part: receiving the flow of gaseous hydrogen sulfide components, oxidizing the gaseous hydrogen sulfide components into a mixture comprising sulfur and water and outputting the mixture comprising sulfur and water at the outlet.

According to an aspect of the invention, there is provided a method as described above, comprising in the $H_2S$ bulk removal stage:

receiving a stream of the feed gas and removing in a first separation process hydrogen sulfide from the feed gas for producing the stream of the first processed feed gas, and wherein the $H_2S$ bulk removal stage comprises a bulk removal stage cyclonic separator and a fractionation column; an outlet of the bulk removal stage cyclonic separator being connected to an intermediate inlet of the fractionation column, and wherein the removal of $H_2S$ is carried out by a first sub-stage to separate first $H_2S$ containing condensables from a first stream portion of the feed gas by the bulk removal stage cyclonic separator and a second sub-stage of using the first $H_2S$ containing condensables as a water absorbing fluid of a second stream portion of the feed gas in the fractionation column, for producing the first processed feed gas.

According to an aspect of the invention, there is provided a method as described above, further comprising feeding the second processed gas stream to a final treatment stage comprising an adsorption tower using as an absorption fluid a non-aqueous solvent containing at least one of a 1-butyl-3-methylimidazolium hexafluorophosphate and a 1-hexyl-3-methylimidazolium-bis(trifluoromethylsulfonyl)imide.

SHORT DESCRIPTION OF THE DRAWINGS

Embodiments will now be described, by way of example only, with reference to the accompanying schematic drawings in which corresponding reference symbols indicate corresponding parts, and in which:

FIG. 1 depicts a processing scheme in accordance with the present invention;

FIG. 2 schematically depicts a first embodiment of a refining system according to the present invention;

FIG. 3 schematically depicts a longitudinal sectional view of a cyclonic separator, as used in the system of the present invention;

FIG. 4 depicts a longitudinal sectional view of an alternative embodiment of the cyclonic separator;

FIG. 5 depicts a longitudinal sectional view of an alternative embodiment of the cyclonic separator.

DETAILED DESCRIPTION

Figure 1:
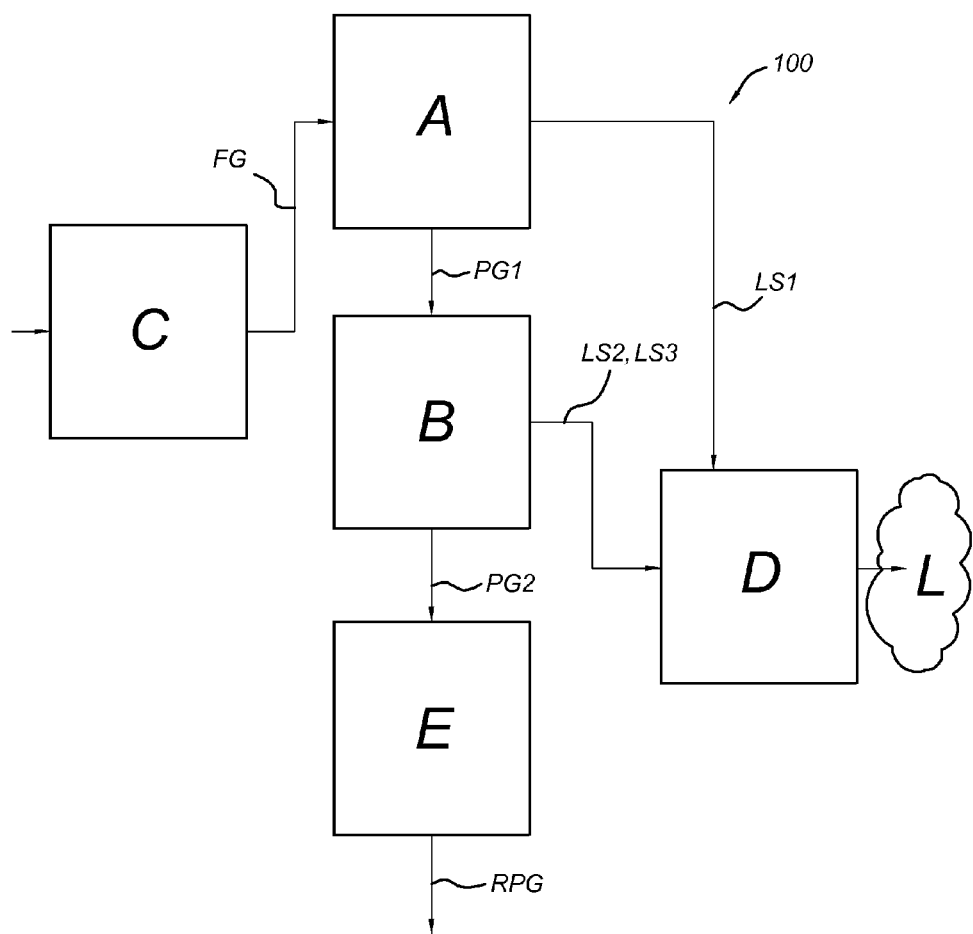

FIG. 1 depicts a scheme of a refining system and method in accordance with an embodiment.

The refining system 100 comprises:

a first part A for a first separation process for bulk removal of $H_2S$ from the unrefined natural gas, a second part B for a second separation process of further $H_2S$ removal by a cyclonic separation process, an inlet part C for receiving feed gas (unrefined natural gas), a drain part D for output of $H_2S$ and sulfur containing liquids.

At inlet part C feed gas FG is received from the gas- or oil field and thermally pre-treated as described below. From the inlet part C the feed gas FG is introduced into the first part A for removal of $H_2S$.

The first part A for bulk removal of $H_2S$ produces a first processed feed gas stream PG1 as a result of the first and second sub-stages. An exemplary embodiment of the first part A is described with reference to FIG. 2. The first processed feed gas stream PG1 is introduced into the second part B for further $H_2S$ removal which is done by the second separation process.

Both first part A and second part B of the refining system produce as by-products respective liquid $H_2S$ and sulfur containing components LS1, LS2, LS3 as result of the cleaning of the feed gas. From both first part A and second part B $H_2S$ containing liquids and/or sulfur containing liquids are transported to the drain part D for output of $H_2S$ and sulfur containing liquids. Typically, drain part D is arranged for introducing the $H_2S$ and sulfur containing liquids into sub-terrestrial reservoirs.

It is noted that from the second part B, a second processed feed gas stream PG2 can be further refined by a final treatment process for a further removal of $H_2S$, which is schematically indicated by a final treatment stage E. The final treatment E may comprise the well-known Amine absorption process and a subsequent Claus process as mentioned above in the section "state of the art". From the final treatment stage E, a refined product gas RPG comprising $H_2S$ at ppm level can be obtained.

In an embodiment, the final absorption process in final treatment stage E is based on the use of an ionic liquid instead of conventional aqueous amine solutions. When using an ionic liquid—for example of the group of 1-alkyl-3-methylimidazolium hexafluorophosphate—a non-aqueous solvent, such as ethanol or acetone can be used.

Furthermore, it is noted that the thermal energy of the first and second processed feed gas streams may be used for pre-cooling the feed gas FG in the inlet part C, which is not shown here.

Below the various parts A, B, C, D of the refining system 100 are described in more detail.

Figure 2:
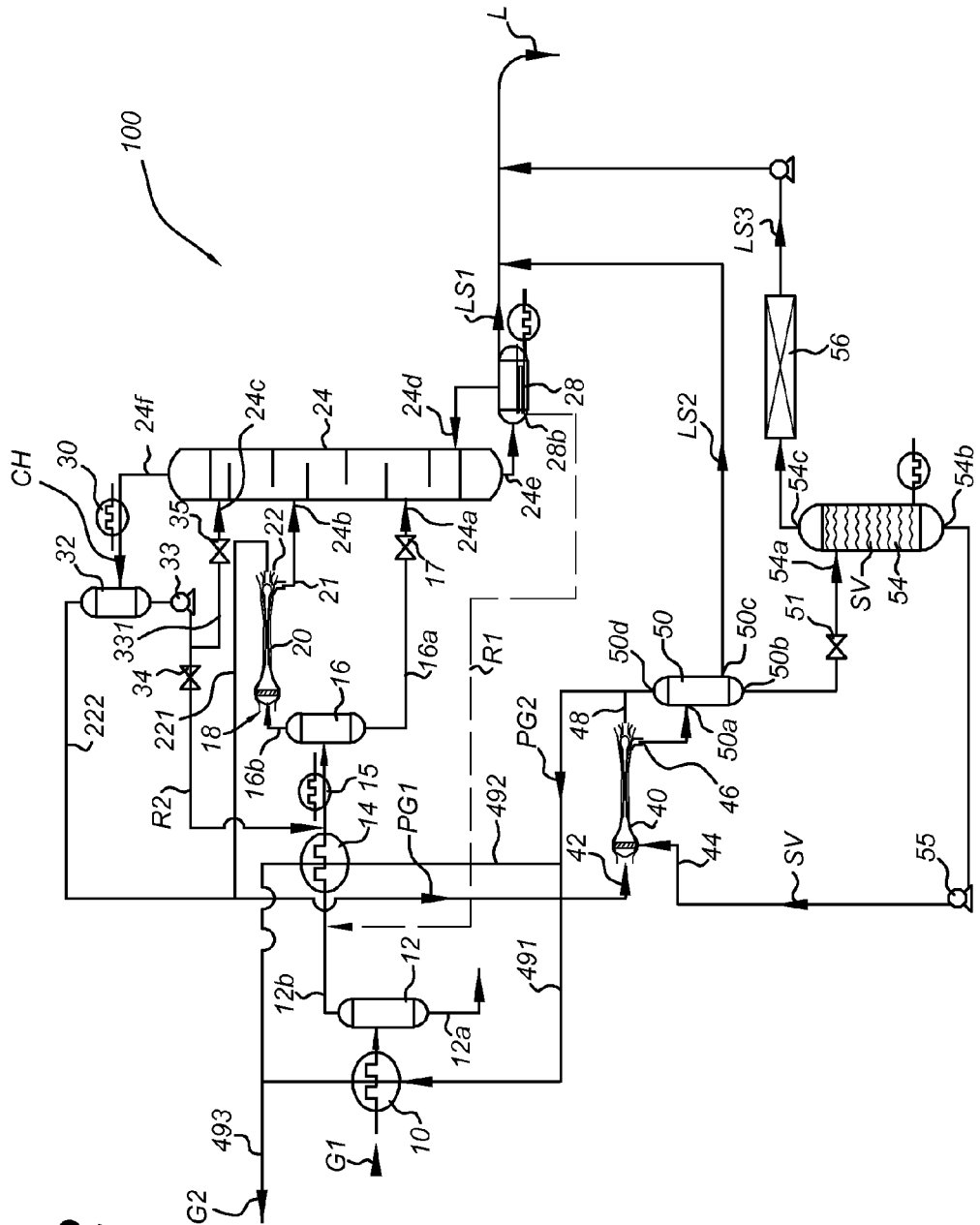

FIG. 2 schematically depicts a first embodiment of a refining system 100 according to the present invention.

In this embodiment, the first part A for bulk removal of $H_2S$ is illustrated by a separation process based on two sub-stages: i.e., a first sub-stage of a first cyclonic separation of liquid containing $H_2S$ from the unrefined natural gas and a second sub-stage of using the liquid containing $H_2S$ as water absorption fluid to absorb water from the gas stream.

In inlet part C feed gas FG is entered at feed gas entry G1 into the refining system. Typically, the feed gas FG entering at G1 is at a pressure of about 100 bar, has a temperature of about 40° C. and comprises about 30% $H_2S$.

Feed gas entry G1 is connected to an inlet of a first pre-cooler 10. The first pre-cooler 10 is arranged for cooling the feed gas by heat exchange with a first flow of second processed feed gas PG2 (as processed in the second part B) that flows through product gas piping 491.

An outlet of the first pre-cooler 10 is connected to bulk separator 12, which is arranged for receiving the pre-cooled feed gas from the first pre-cooler and for separating liquids from the pre-cooled feed gas. The bulk separator 12 comprises an outlet 12a for water and high boiling hydrocarbons (i.e., with relatively high boiling temperature) and a second outlet 12b for the feed gas. The second outlet 12b of the bulk bulk separator 12 is connected to a second pre-cooler 14 which is arranged for cooling the feed gas by heat exchange with a second flow of second processed feed gas PG2 that flows through second product gas piping 492.

Feed gas FG leaving the bulk separator 12 typically is at a pressure of about 100 bar and has a temperature of about 30° C.

The feed gas outlet of the second pre-cooler 14 is connected through an inlet refrigerator 15 to an inlet separator 16. The feed gas FG as cooled by the second pre-cooler 14 is further cooled by the inlet refrigerator 15 and enters the inlet separator 16.

The inlet separator 16 is arranged for separating liquid $H_2S$, as liquefied by the stage of the second pre-cooler 14 and the inlet refrigerator 15, from the remaining feed gas.

A first outlet 16a of the inlet separator 16 is arranged for draining away liquid $H_2S$ possibly mixed with liquefied heavier hydrocarbons. The first outlet 16a of the inlet separator 16 is connected through a first valve 17 with a fractionation column 24 on first position 24a.

A second outlet 16b of the inlet separator 16 which is arranged for passing the remaining feed gas, is connected to a gas inlet 18 of a $H_2S$ bulk removal stage cyclonic fluid separator 20. Such a cyclonic separator is known from the disclosure WO03029739.

At the second outlet 16b of the inlet separator 16 the remaining feed gas may be at a pressure of about 99 bar (somewhat reduced in comparison to the pressure at entry G1) and may have a temperature of about −18° C.

The $H_2S$ bulk removal stage cyclonic fluid separator 20 is arranged to receive at the gas inlet 18 the remaining feed gas from the second outlet 16b of the inlet separator 16 and is further arranged to accelerate the remaining feed gas stream to a possibly supersonic speed and to rapidly cool down the remaining feed gas stream as a result of adiabatic expansion. The rapid cooling will cause condensation and/or solidification of $H_2S$ condensables in the remaining feed gas stream into small droplets or particles. Such condensables are defined as components which under standard conditions (room temperature, atmospheric pressure) are occurring in a gas phase, but at lower temperature and/or higher pressure in a liquid phase.

The $H_2S$ containing condensables may further comprise water, hydrocarbon, carbon dioxide, condensates, waxes, and gas hydrates.

The $H_2S$ bulk removal stage cyclonic fluid separator 20 furthermore comprises an assembly to create a swirling motion of the gas stream within the separator. The centrifugal forces exerted by the swirling motion on the mixture of remaining feed gas and $H_2S$ containing condensables will induce the relatively high density condensed and/or solidified $H_2S$ containing liquids to swirl to the outer periphery of the interior of separator 20 whereas relatively low density gaseous components are concentrated near the central axis of the separator 20.

The low density gaseous components concentrated in the separator 20 are subsequently discharged as part of the first processed feed gas stream PG1 from the separator through a primary central outlet conduit 22, whereas the $H_2S$ enriched fluids are discharged from the separator through a secondary outlet 21 which is located at the outer circumference of the diverging outlet section. The $H_2S$ bulk removal stage cyclonic fluid separator 20 will be discussed in more detail with reference to FIG. 3.

The secondary outlet 21 of the $H_2S$ bulk removal stage cyclonic separator 20 is connected to the fractionation column 24 on a second position 24b for entering a flow of the $H_2S$ enriched fluids into the fractionation column 24.

Typically, the flow of $H_2S$ enriched fluids is at a pressure of about 70 bar and has a temperature of about −30° C. It is noted that the $H_2S$ containing fluids may be at least partially in a liquid state.

The primary central outlet conduit 22 is connected to a piping 221 which is arranged for transporting the low density gaseous components concentrated in the separator 20 as part of the first processed feed gas stream PG1 to the second part B of the refining system 100 for $H_2S$ removal by cyclonic separation. The gas stream comprising the low density gaseous components concentrated in the $H_2S$ bulk removal stage cyclonic separator 20 is typically at a pressure of about 70 bar, at a temperature of about −30-−20° C. and comprises about 6% to about 8% $H_2S$.

The flow of $H_2S$ containing fluids enters the fractionation column at second position 24b as $H_2S$ reflux. The $H_2S$ reflux dissolves the majority of the water entering the column 24. By using the $H_2S$ reflux as desiccant, (gas-)hydrates can be avoided even when the column top temperature of the fluid is operated at −5° C. at a pressure of ~80 bar.

The $H_2S$ enriched liquid stream leaving the bottom 24e of the fractionation column 24 passes through a reboiler 28. The reboiler 28 is arranged for evaporating mainly the dissolved methane and a portion of the $H_2S$ from the $H_2S$ enriched liquid stream as a $H_2S$ and hydrocarbon gas mixture which is re-entered in the fractionation column 24 at position 24d, between bottom 24e and the second position 24b for entering the $H_2S$ containing fluids.

In an embodiment, a part of said $H_2S$ enriched liquid from bottom 24e may be refluxed from an outlet 28b of the reboiler 28 to the inlet of second pre-cooler 14, as indicated by dashed line R1.

The remainder i.e., liquid $H_2S$ components by-product LS1 (indicated by arrow LS1) of the $H_2S$ enriched liquid stream is thereafter pumped from the reboiler 28 into a reservoir at position L (i.e., part D of the refining system 100). The reservoir can be a sub-terrestrial reservoir.

At the top 24f of the fractionation column 24, a gas stream CH containing hydrocarbon and $H_2S$, relatively rich with hydrocarbons (about 90% hydrocarbons, 10% $H_2S$), at a pressure of about 70 bar and at a temperature of about −10° C. flows through a reflux refrigerator 30 to a cold separator 32.

The cold separator 32 is arranged for separating gaseous components from liquid components of the gas stream CH.

Through piping 222, the gaseous components of the gas stream CH are transported from the cold separator 32 as a further part of the first processed feed gas PG1 to the second part B of the refining system for $H_2S$ removal by the second separation process. The gas stream of gaseous components is typically at a pressure of about 70 bar, at a temperature of about −30-−20° C. and comprises about 6% to 8% $H_2S$.

The cold separator 32 is further connected through a pump 33 and re-entry piping 331 to a further entrance 24c of the fractionation column for re-entry of the liquid components from the gas stream CH into the fractionation column 24.

Typically, the further entrance 24c is located between the top 24f and the second position 24b of the fractionation column 24. In the re-entry piping 331a second valve 35 is arranged for controlling the re-entry flow of the liquid components.

Additionally, the re-entry piping 331 over a third valve 34 ties into the piping between the outlet of the second pre-cooler 14 and the entry into the inlet refrigerator 15 for re-entry R2 of liquid components from the cold separator 32 at that point. By suitable switching of the second and third valves 34, 35, the flow of liquid components from the hydrocarbon and $H_2S$ containing gas stream CH can be directed to either the entry of the refrigerator 15 or the fractionation column 24 or both.

Piping 221 from the primary outlet 22 of $H_2S$ bulk removal stage cyclonic separator 20 and piping 222 from the gas outlet of the cold separator 32 are interconnected so as to form a transport line 221, 222 for the first processed feed gas stream PG1 (indicated by arrow PG1) comprising the gaseous components of the hydrocarbon and $H_2S$ containing gas stream CH and the gaseous components of the remaining feed gas for feeding to the second part B of the refining system 100.

It is noted that the first part A as described here is merely an example of a $H_2S$ bulk removal stage. Alternatively, instead of the fractionation column 24a two column fractionation plant can be used which comprises a stripping column (instead of the relatively hot lower part of the fractionation column 24) and an absorption column (instead of the relatively cold upper part of the fractionation column 24). In another alternative, instead of a two column fractionation plant arrangement, the fractionation may be carried out in a two inline gas-liquid contractors arrangement (e.g., a Revex™ system).

It will be appreciated that in another alternative the first part A of the refining system can comprise some existing $H_2S$ bulk removal process such as disclosed in U.S. Pat. No. 6,735,979 instead of the cyclonic separation by the $H_2S$ bulk removal stage cyclonic separator 20.

In an alternative embodiment,—in case the feed gas contains less than about 15% $H_2S$—the first part A of the refining system may comprise only the cooling steps 10, 14 and 15 and separators 12, and 16, combined with a conventional dehydration process downstream of bulk separator 12. Such dehydration process may comprise glycol absorption towers and mole-sieve columns. The liquids produced via outlets 12a and 16a—containing merely water and hydrocarbons—will be handled in traditional stabilization units. The first processed feed gas stream PG1 in such case will still contain about 15% $H_2S$ when entering the second part B, however with a water content not more 20 ppm/v and a temperature not less than −30° C.

In the second part B of the refining system 100, the transport line 221, 222 for the first processed feed gas PG1 is connected to a cyclonic separator 40.

The cyclonic separator 40 comprises a first inlet 42 for receiving the first processed feed gas stream PG1, a second inlet 44 for receiving an additive component, a primary outlet 48 and a secondary outlet 46.

The primary outlet 22 of the first cyclonic separator 20 and the gas outlet of the cold separator 32 are connected through piping 221 and piping 222 to the first inlet 42 of the cyclonic separator 40.

The second inlet 44 of the cyclonic separator 40 is connected to a solvent recovery unit 54 for receiving a stream of an additive component SV to add to the first processed feed gas stream PG1. The second inlet 44 is arranged to produce a spray of the additive component SV of which the spray particles are introduced into the cyclonic separator 40.

The additive component SV comprises at least a substance that is capable of dissolving $H_2S$. Such a substance comprises at least one additive component being selective for dissolving hydrogen sulphide. The additive component is a non-aqueous fluid and comprises as constituent for example one or more of the following chemical groups, i.e., an alcohol (e.g. methanol, ethanol etc), a diol, (e.g. ethylene glycol, dimethyl ether of polyethylene glycol), an ionic liquid, a dipolar aprotic solvent (e.g. Sulpholane).

For example such a substance can be a sulfolane. More recently so called ionic liquids are available to dissolve specific species. Such ionic liquid—selectively dissolving $H_2S$—may be applied as additive.

Ionic liquids can be defined as salts having a melting point of about 100 degrees Celsius or lower. Ionic liquids consist of an organic cation and an anion which can be either organic (e.g. acetate) or inorganic (e.g. hexafluoro-phosphate). Frequently used cations are based on one of the groups of imidazoles or pyrrolidines. A suitable, albeit non-limiting example of an ionic liquid which selectively dissolves $H_2S$, is 1-butyl-3-methylimidazolium hexafluorophosphate. Also derivatives hereof—such as 1-octyl-3-methylimidazolium hexafluorophosphate or 1-ethyl-3-methylimidazolium hexafluorophosphate—can be used for this purpose. For a selective absorption of carbon dioxide, which may be present in the first processed gas stream, it is preferred to apply ionic liquids containing fluorinated anions such as—bis(trifluoromethylsulfonyl)imide. A suitable additive for selectively removing carbon dioxide may be 1-hexyl-3-methylimidazolium-bis(trifluoromethylsulfonyl)imide.

As described above, the first processed feed gas stream PG1 is typically at a pressure of about 70 bar, at a temperature of about −30--−20° C. and comprises from about 6%-8% to about 15% $H_2S$ before entering the second part B of the refining system 100.

The cyclonic separator 40 is arranged to accelerate the stream of first processed feed gas PG1 and the spray of additive component SV to a possibly supersonic speed. Upon introduction the spray particles mix with the gas stream and due to the interaction of the gas stream and the spray particles, $H_2S$ from the gas stream is absorbed in the spray and adsorbed to the surface area of spray particles. Additionally, as a result of adiabatic expansion, some condensation and/or solidification of vapors in the stream into small droplets or particles may occur.

The cyclonic separator 40 furthermore comprises an assembly to create a swirling motion of the stream within the cyclonic separator 40. The centrifugal forces exerted by the swirling motion on the mixture of gas and spray particles will cause a separation of the spray particles (and any additionally condensed fluids) from the gas stream and induce the relatively high density spray particles from the stream to swirl to the outer periphery of the interior of cyclonic separator 40 whereas relatively low density gaseous components in the stream are concentrated near the central axis of the cyclonic separator 40. A more detailed description of the cyclonic separator 40 will be given with reference to FIG. 3.

As a result, the liquids produced in the cyclonic separator 40 are typically enriched in $H_2S$, while the $H_2S$ level in the gaseous component of the stream is reduced.

The gaseous component forming part of the second processed feed gas PG2 is subsequently discharged from the second cyclonic separator through a primary central outlet conduit 48, whereas a stream of $H_2S$ enriched condensables mixed with residual gas is discharged from the second cyclonic separator through a secondary outlet 46 which is located at the outer circumference of the diverging outlet section of the second cyclonic separator 40. The cyclonic separator 40 will be discussed in more detail with reference to FIG. 2.

The primary central outlet conduit 48 of the second cyclonic separator 40 is connected to product gas piping 491 and second product gas piping 492. The flow of second processed feed gas PG2 through product gas piping 491 and second product gas piping 492 is indicated by arrow PG2.

The secondary outlet of the second cyclonic separator 40 is connected to an entry 50a of second liquid separator 50.

The second liquid separator 50 is arranged for separating the mixture of $H_2S$ enriched liquids and additive component SV from the residual gas in the stream from the second outlet 46 of the second cyclonic separator 40. The second liquid separator 50 comprises a first, second and third exit 50b, 50c, 50d.

The first exit 50b at the bottom of the second liquid separator 50 is arranged for draining a first $H_2S$ containing liquid (comprising $H_2S$ enriched liquids and additive component SV) to the solvent recovery unit 54.

The second exit 50c located between the first exit 50b and the entry 50a of the second liquid separator 50 is arranged for draining a second $H_2S$ containing liquid, comprising $H_2S$ enriched liquids i.e., liquid $H_2S$ components by-product LS2 (indicated by arrow LS2) to be pumped to the (sub-terrestrial) reservoir at position L.

The third exit 50d located at a top of the second liquid separator 50 is arranged for feeding gas as a further part of the second processed feed gas stream PG2 to the first and second product gas piping 491, 492.

The solvent recovery unit 54 is connected with an entry 54a to the first exit 50b of the second liquid separator 50 for receiving the first $H_2S$ containing liquid that comprises $H_2S$ enriched liquids and additive component SV.

The solvent recovery unit comprises a first outlet 54b at a bottom part of the reservoir and a second outlet 54c at the top of the unit.

The solvent recovery unit is arranged for stripping the hydrogen sulfide components in dissolved state from the additive component SV in liquid state, in such a way that the evaporated hydrogen sulfide components are made to flow out from the solvent recovery unit at the second outlet 54c to an oxidation unit 56, and the additive component SV is made to flow out at the second outlet 54b. The flow of additive component SV is redirected to the second inlet 44 of the cyclonic separator 40. A second pump 55 may be provided for maintaining the flow of additive component from the solvent recovery unit 54 to the second inlet 44 of the cyclonic separator 40. Typically, the gas pressure in the solvent recovery unit 54 is about 1 bar at a temperature of the liquid of about 150° C.

The oxidation unit 56 is connected to the second outlet 54c of the solvent recovery unit 54 for receiving the gaseous hydrogen sulfide components and is arranged for oxidizing the hydrogen sulfide so as to form a mixture of sulfur and water according to the Claus process. The oxidation unit 56 has an exit from which the mixture of sulfur and water (indicated by arrow LS3) can be transported to the reservoir L for sub-terrestrial storage.

The gas streams from the second liquid separator 50 and from the primary central outlet conduit 48 of the second cyclonic separator 40 are mixed in the product gas piping 491, 492.

The refining system 100 comprises a product gas exit G2 or third product piping 493, into which the first and second product gas piping 491, 492 end, and the gas streams of the second processed feed gas PG2 are combined.

At the product gas exit G2, the second processed feed gas PG2 is relatively enriched with hydrocarbons, and may have a composition of about 99% hydrocarbons and about 1% $H_2S$. The pressure at the second processed feed gas exit G2 may be about 40 bar, the temperature of the second processed feed gas PG2 may be about 20-25° C.

Advantageously, the refining system 100 according to the present invention is capable of reducing the $H_2S$ level of the natural gas being processed to a relatively low level which allows to reduce the scale and complexity of the system needed for post-treatment process of the processed feed gas. Also, the refining system 100 advantageously allows storage of $H_2S$ containing components and sulfur produced in the system in sub-terrestrial reservoirs which contributes to lower operational costs associated with the disposal of these substances. Moreover, the investment for the second part B for further $H_2S$ bulk removal by the cyclonic separation process (in terms of costs and complexity) is outweighed by the gains for the reduced post treatment process.

Figure 3:
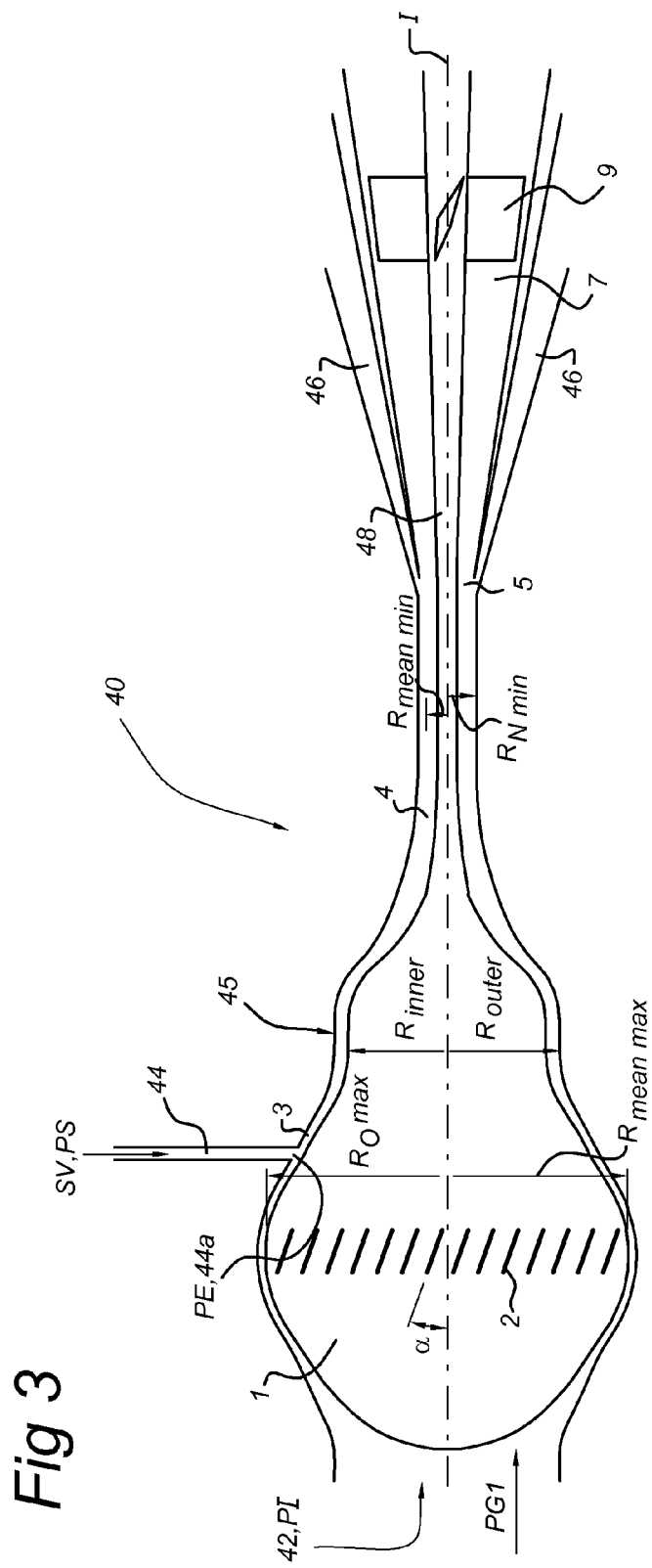

FIG. 3 depicts a longitudinal sectional view of an embodiment of the cyclonic separator 40 in the second part of the refining system 100 as described above. The cyclonic separator comprises an assembly to create a swirling motion of the stream within the cyclonic separator. There is shown a cyclonic inertia separator which comprises a swirl inlet device as assembly to create a swirling motion of the stream. The swirl inlet device comprises a pear-shaped central body 1 on which a series of swirl imparting vanes 2 are mounted and which is arranged coaxial to a central axis I of the cyclonic separator and inside the cyclonic separator housing such that an annular flow path 3 is created between the central body 1 and separator housing 45. The cyclonic separator further comprises a tubular throat portion 4 from which in use the swirling fluid stream is discharged into a diverging fluid separation chamber 5 which is equipped with a central primary outlet conduit 7 for gaseous components and with an outer secondary outlet conduit 46 for ($H_2S$ containing) condensables enriched fluid components. The central body 1 may comprise a substantially cylindrical elongate tail section 48 on which an assembly of flow straightening blades 9 is mounted. The central body 1 has a largest outer width or diameter $2R_{o\ max}$ which is larger than the smallest inner width or diameter $2R_{n\ min}$ of the tubular throat portion 4.

The swirl imparting vanes 2 which are oriented at an angle ($\alpha$) relative to the central axis I create a circulation ($\Gamma$) in the fluid stream. The angle $\alpha$ may be between 20° and 30°. The fluid stream is subsequently induced to flow into the annular flow area 3. The cross-sectional surface of this area is defined as:

$$A_{annulus} = \pi(R_{outer}^2 - R_{inner}^2)$$

The latter two being the outer radius and inner radius of the annulus at a selected location. The mean radius of the annulus at that location is defined as:

$$R_{mean} = \sqrt{[\tfrac{1}{2}(R_{outer}^2 + R_{inner}^2)]}.$$

At the maximum value of the mean annulus radius $R_{mean,\ max}$ the fluid stream is flowing between the assembly of swirl imparting vanes 2 at a velocity (U), which vanes deflect the flow direction of the fluid stream proportional to the deflection angle ($\alpha$) and so obtaining a tangential velocity component which equals $U_\phi = U \cdot \sin(\alpha)$ and an axial velocity component $U_x = U \cdot \cos(\alpha)$.

In the annular space 3 downstream of the swirl imparting vanes 2 the swirling fluid stream is expanded to high velocities, wherein the mean annulus radius is gradually decreasing from $R_{mean,\ max}$ to $R_{mean,\ min}$.

It is considered that during this annular expansion two processes may occur:

(1) The heat or enthalpy in the flow (h) decreases with the amount $\Delta h = -\tfrac{1}{2} U^2$, thereby condensing those flow constituents which first reach phase equilibrium. This results in a swirling mist flow containing small liquid or solid particles.

(2) The tangential velocity component increases inversely with the mean annulus radius $U_\phi$ substantially in accordance with the equation $$U_{\phi,final} = U_{\phi,initial} \cdot (R_{mean,max}/R_{mean,min}).$$

This results in a strong increase of the centrifugal acceleration of the fluid particles ($a_c$), which will finally be in the order of:

$$a_c = (U_{\phi,final}^2 / R_{mean,min}).$$

In the tubular throat portion 4 the fluid stream may be induced to further expand to higher velocity or be kept at a substantially constant speed. In the first case condensation may be ongoing and particles may gain mass. In the latter case condensation is about to stop after a defined relaxation time. In both cases the centrifugal action causes the particles to drift to the outer circumference of the flow area adjacent to the inner wall of the separator housing 45, which is called the separation area. The time period for the particles to drift to this outer circumference of the flow area determines the length of the tubular throat portion 4.

Additional to the two processes that may occur during annular expansion, an interaction of the first processed feed gas stream and the additive component will occur. The cyclonic separator 40 comprises a second inlet 44 in the housing 45 that is arranged to introduce a flow of additive component SV into the cyclonic separator 40. The second inlet 44 is located at the periphery of the wall of the housing 45, so as to introduce the additive component SV into the gas stream in a space region between the outer wall of the housing 45 and the central body 1.

In an embodiment, the second inlet 44 is located in a wall of the housing 45 at the periphery of central body 1, downstream of the swirl imparting vanes of the cyclonic separator 40. Also, the second inlet 44 is constructed in such a way that upon introduction of the additive component SV the additive component is sprayed and can mix with the swirling first processed feed gas stream PG1.

In an embodiment, the second inlet 44 is arranged with one or more nozzles (not explicitly shown) to generate a spray (in case of more nozzles a distributed spray) from the additive component SV upon introduction into the cyclonic separator 40.

In an embodiment, the second inlet 44 of the cyclonic separator 40 is arranged to feed the flow of additive component SV into the first processed feed gas stream PG1 at a pressure PS higher than the inlet pressure PI at the first inlet 42 of the first processed feed gas stream. This can be referred to as an injection mode of operation of the cyclonic separator.

In an alternative embodiment, the cyclonic separator 40 is arranged to feed the flow of additive component SV into the first processed feed gas stream PG1 at a pressure PS which is lower than the inlet pressure PI at the first inlet 42 of the first processed feed gas stream but is higher than the local static pressure PE at the locus of entry 44a in the first processed feed gas stream PG1. This can be referred to as an ejection mode of operation of the cyclonic separator.

FIG. 4 depicts a longitudinal sectional view of an alternative embodiment of the cyclonic separator 40 in the second part of the refining system 100 as described above. In FIG. 4 entities with the same reference number as shown in the preceding figures refer to corresponding entities.

In this alternative embodiment, the cyclonic separator 40 comprises a second inlet 144 arranged to introduce a flow of additive component SV into the cyclonic separator 40. The second inlet 144 is located in the peripheral wall of the central body 1. In an embodiment, the second inlet 144 is located in the peripheral wall of the central body 1 downstream of the swirl imparting vanes of the cyclonic separator 40.

The cyclonic separator 40 may be operated in either injection or ejection mode.

FIG. 5 depicts a longitudinal sectional view of an embodiment of the cyclonic separator 40 in the second part of the refining system 100 as described above. In FIG. 5 entities with the same reference number as shown in the preceding figures refer to corresponding entities.

According to this embodiment, the central body 1 does not comprise an elongated tail section 48 as in FIG. 3. Instead, the central body 1 comprises an outlet 47. The outlet 47 is positioned on the downstream side of the central body 1, directed towards the throat portion 4. The position and direction of the outlet 47 substantially coincide with the central axis I. The outlet 47 is connected on a distal side to a solvent recovery unit 54 for receiving a stream of an additive component SV to add to the first processed feed gas stream PG1. The inlet (nozzle) 47 is arranged to produce a spray of the additive component SV of which the spray particles are introduced into the first processed feed gas stream. The outlet 47 may also be referred to as a central outlet 47.

In a preferred embodiment, the cyclonic separator 40 is arranged in ejection mode to feed the flow of additive component SV into the first processed feed gas stream PG1 at a pressure PS which is lower than the inlet pressure PI at the first inlet 42 of the first processed feed gas stream but is higher than the local static pressure PE at the locus of entry 47 in the first processed feed gas stream PG1.

It is considered that due to the supersonic speed of the mixture of spray and gas stream, the time of residence in the cyclonic separator is relatively short. Therefore, the additive component should be selected to have a relatively high selectivity with the $H_2S$ component to allow for sufficient mass transfer rate via adsorption or absorption to take place during the time of residence window.

The additive component SV may comprise at least one constituent that absorbs $H_2S$ by a van der Waals interaction. Such an interaction may involve a condensation of $H_2S$ on the surface of the spray particles. In a non-limiting manner, additive constituents of the van der Waals interaction type comprise sulfolane(s) and ionic liquids.

Further, to improve the mass transfer rate of $H_2S$ to the surface of the additive component SV and $H_2S$ containing components in the mixed gas stream, a relatively large contact surface should be established by a sufficiently high density of spray particles. The contact surface is related to a particle density of the spray particles and to a size of the spray particles.

In an embodiment, the nozzle of the second inlet may be arranged to create a particle density of at least about $10^8/m^3$.

In a further embodiment, the nozzle of the second inlet 44 is arranged to create spray particles with a size between about 50 μm and about 0.2 μm. In an alternative embodiment, the nozzle of the second inlet 44 is arranged to create spray particles with a size between about 20 μm and about 1 μm.

Downstream of the tubular throat portion 4 the $H_2S$ 'wet' fluid components tend to concentrate adjacent to the inner surface of the diverging fluid separation chamber 5 and the 'dry' gaseous fluid components are concentrated at or near the central axis I, whereupon the liquid enriched 'wet' fluid components are discharged into an outer secondary fluid outlet 6 via a series of slots whereas the 'dry' gaseous components are discharged into the central primary fluid outlet conduit 7.

In the diverging primary fluid outlet conduit 7 the fluid stream is further decelerated so that the remaining kinetic energy is transformed into potential energy.

The diverging primary outlet conduit may be equipped with an assembly of flow straightening vanes 9 to recover the circulation energy.

The descriptions above are intended to be illustrative, not limiting. Thus, it will be apparent to one skilled in the art that modifications may be made to the invention as described without departing from the scope of the claims set out below.

The following clauses define various aspects of the present invention.

Clause 1. Refining system for refining a feed gas comprising hydrocarbons and hydrogen sulfide having a first concentration of hydrogen sulfide, the refining system comprising a first part for producing a stream of a first processed feed gas, a second part for producing a second stream of a second processed feed gas from the stream of the first processed feed gas using a separation process for $H_2S$ removal, the second part comprising a cyclonic separator, wherein the cyclonic separator comprises a first inlet, a second inlet and is arranged for receiving at the first inlet the stream of first processed feed gas,
receiving at a distal side of the second inlet a flow of additive component, the additive component being a solvent for hydrogen sulfide;
spraying from the second inlet the flow of additive component into the first processed feed gas stream so as to form a mixture of sprayed additive and first processed feed gas, and
creating at a first outlet a first flow of the second processed feed gas and at a second outlet a second flow of substantially hydrogen sulfide containing liquid, the second processed feed gas having a second concentration of hydrogen sulfide, the second concentration being relatively lower than the concentration of the stream of the first processed feed gas, received at the first inlet.

Clause 2. Refining system according to clause 1, wherein the cyclonic separator comprises in a housing a swirl inlet device comprising a pear-shaped central body which is arranged inside the housing coaxial to a central axis of the separator; a space region being arranged in between the central body and the housing for an annular flow path, and wherein the second inlet is located at the periphery of the central body, so as to introduce the additive component into the annular flow path.

Clause 3. Refining system according to clause 2, wherein the second inlet is arranged with at least one nozzle to generate the spray of additive component in the annular flow path.

Clause 4. Refining system according to clause 3, wherein the at least one nozzle of the second inlet is located in a wall of the housing at the periphery of central body, for introduction of the additive component into the gas stream in a space region between the outer wall of the housing and the central body.

Clause 5. Refining system according to clause 3, wherein the at least one nozzle of the second inlet is located in a peripheral wall of the central body, for introduction of the additive component into the gas stream in a space region between the outer wall of the housing and the central body.

Clause 6. Refining system according to clause 3, wherein the cyclonic separator further comprises a tubular throat portion downstream of the central body, and the at least one nozzle of the second inlet is located on the downstream side of the central body, directed towards the tubular throat portion, in which position and direction of the second inlet substantially coincide with the central axis.

Clause 7. Refining system according to clause 1, wherein the additive component comprises at least one constituent for absorbing hydrogen sulfide.

Clause 8. Refining system according to clause 1 or 7, wherein the additive component comprises as constituent at least one of a sulfolane and an ionic liquid.

Clause 9. Refining system according to clause 8, wherein the ionic liquid comprises at least one of a 1-butyl-3-methylimidazolium hexafluorophosphate and a 1-hexyl-3-methylimidazolium-bis(trifluoromethylsulfonyl)imide.

Clause 10. Refining system according to clause 1, wherein the second inlet is arranged to create a spray with particle density of at least about $10^8/m^3$.

Clause 11. Refining system according to clause 1, wherein the second inlet is arranged to create spray particles with a size selected from one of a range from about 50 μm to about 0.2 μm, and a range from about 20 μm to about 1 μm.

Clause 12. Refining system according to clause 1, wherein the second part comprises a liquid separator, the liquid separator comprising a flow inlet, a first, second and third liquid outlet, the liquid separator being arranged for:
receiving at the flow inlet the second flow of a substantially hydrogen sulfide containing fluid;

separating the second flow of the substantially hydrogen sulfide containing fluid in a first, second and third component, the first component being second processed feed gas, the second component being a first liquid hydrogen sulfide and the third component being a mixture of liquid hydrogen sulfide mixed and additive component;

outputting at the first outlet the second processed feed gas to the outlet part;

outputting at the second outlet the first liquid hydrogen sulfide components to a drain part, and outputting at the third outlet the mixture of liquid hydrogen sulfide and additive component.

Clause 13. Refining system according to clause 12, the second part further comprising a further liquid separator arranged for receiving the mixture of liquid hydrogen sulfide and additive component from the second liquid separator and for separating the additive component from the liquid hydrogen sulfide, the further liquid separator comprising an inlet for receiving the mixture of liquid hydrogen sulfide and additive component, a first outlet for outputting a flow of gaseous hydrogen sulfide components and a second outlet for outputting of additive component, the second outlet being connected to the second inlet of the cyclonic separator.

Clause 14. Refining system according to clause 13, the second part further comprising an oxidation unit, the oxidation unit having an inlet being connected to the first outlet of the further liquid separator and having an outlet being connected to the drain part, the oxidation unit being arranged for receiving the flow of gaseous hydrogen sulfide components, oxidizing the gaseous hydrogen sulfide components into a mixture comprising sulfur and water and outputting the mixture comprising sulfur and water at the outlet.

Clause 15. Refining system according to clause 1, wherein the first part comprises a $H_2S$ bulk removal stage and is arranged to receive a stream of the feed gas and to remove in a first separation process hydrogen sulfide from the feed gas by the $H_2S$ bulk removal stage for producing the stream of the first processed feed gas, and wherein the $H_2S$ bulk removal stage comprises a bulk removal stage cyclonic separator and a fractionation column; an outlet of the bulk removal stage cyclonic separator being connected to an intermediate inlet of the fractionation column, and wherein the removal of $H_2S$ is carried out by a first sub-stage to separate first $H_2S$ containing condensables from a first stream portion of the feed gas by the bulk removal stage cyclonic separator and a second sub-stage of using the first $H_2S$ containing condensables as a water absorbing fluid of a second stream portion of the feed gas in the fractionation column, for producing the first processed feed gas.

Clause 16. Refining system according to clause 1, further comprising an inlet part for receiving the feed gas and an outlet part for output of the second processed feed gas; the inlet part being connected to the first part for providing the feed gas to the first part, the outlet part being connected to the second part for receiving the second processed feed gas.

Clause 17. Refining system according to clause 1, wherein the first part comprises a first pre-cooler arranged for:

receiving at a feed gas inlet the feed gas, and cooling of the received feed gas by heat exchange with at least a portion of the second processed feed gas stream to produce cooled feed gas.

Clause 18. Refining system according to clause 17, wherein the first part comprises a bulk separator arranged for:

receiving at a bulk separator inlet the cooled feed gas from the first pre-cooler, and separating water and high boiling hydrocarbon liquids from the cooled feed gas after passing at least a first cooler of the pre-cooler to produce at a first water separator outlet a dried feed gas.

Clause 19. Refining system according to clause 18, wherein the first part comprises a second pre-cooler, the second cooler being arranged for receiving dried feed gas from the bulk separator and for cooling of the received dried feed gas by heat exchange with at least a second portion of the second processed feed gas stream to produce dried and cooled feed gas.

Clause 20. Refining system according to clause 19 wherein the gas outlet of the bulk separator is fed to a gas dehydration unit to produce a dried pre cooled gas to the second cooler.

Clause 21. Refining system according to any one of clauses 17-20, wherein the first part comprises an inlet separator arranged for:

receiving at a first inlet separator inlet, either dried feed gas or dried and cooled feed gas, separating from the received either dried or dried and cooled feed gas a first liquid hydrogen sulfide component, outputting at a first outlet of the inlet separator the first liquid hydrogen sulfide component, and outputting at a second outlet of the inlet separator a remaining feed gas as the first stream portion of the feed gas.

Clause 22. Refining system according to clause 21, wherein the first outlet of the inlet separator is connected to a liquid inlet of the fractionation column for entry of the first liquid hydrogen sulfide component in the fractionation column, and the second outlet of the inlet separator is connected to an inlet of the first cyclonic separator providing the first stream portion of the feed gas.

Clause 23. Refining system according to clause 22, wherein the bulk removal stage cyclonic separator comprises a gas inlet connected to the second outlet of the inlet separator, a primary outlet for discharging a cyclonically separated gas stream and a secondary outlet for discharging a cyclonically separated condensables containing flow; the bulk removal stage cyclonic separator being arranged to receive at the gas inlet the first stream portion of the feed gas, to cool the first stream portion of the feed gas substantially adiabatically, so as to form a first liquid hydrogen sulfide, and to create at the primary outlet a first flow of the first processed feed gas and at the secondary outlet a second flow of substantially the first liquid hydrogen sulfide.

Clause 24. Refining system according to clause 23, wherein the primary outlet of the bulk removal stage cyclonic separator is connected to a gas inlet of the cyclonic separator and the secondary outlet of the bulk removal stage cyclonic separator is connected to the intermediate inlet of the fractionation column.

Clause 25. Refining system according to clause 24, wherein the fractionation column further comprises a bottom outlet and a top outlet; the liquid inlet being arranged between the bottom outlet and the intermediate outlet.

Clause 26. Refining system according to clause 25, wherein the top outlet of the fractionation column is connected to a reflux separator stage, the reflux separator stage comprising an inlet connected to the top outlet of the fractionation column, a first outlet connected to the inlet of the cyclonic separator and a second outlet connected to a reflux line; the reflux separator stage being arranged for:

receiving at the inlet fractionated feed gas from the fractionation column, separating first processed feed gas from the fractionated feed gas, discharging at the first outlet the first processed feed gas, and discharging at the second outlet a reflux;

wherein the reflux line is connected to one inlet selected from a further inlet of the refrigerator for entry of the reflux as a part of the feed gas and a second further inlet for entry of the reflux in an upper and/or relatively cold region of the fractionation column.

Clause 27. Refining system according to clause 25 or 26, wherein the bottom outlet of the fractionation column is connected to an inlet of a reboiler; the reboiler being arranged with a first outlet for a return feed to a return feed inlet in a lower hot region of the fractionation column and a second outlet connected to a drain part for output of hydrogen sulfide and sulfur containing liquid.

Clause 28. Refining system according to clause 25 or 26, wherein the bottom outlet of the fractionation column is connected to the inlet of the second pre cooler for reflux of $H_2S$ enriched liquid in a mix with the dried feed gas from the first cooler.

Clause 29. Refining system according to clause 25 or 26 wherein the second processed gas stream is fed to final treatment stage comprising an adsorption tower using as an absorption fluid a non-aqueous solvent containing at least one of a 1-butyl-3-methylimidazolium hexafluorophosphate and a 1-hexyl-3-methylimidazolium-bis(trifluoromethylsulfonyl)imide.

Clause 30. Refining system according to clause 1, wherein the first part comprises at least one cooling device for cooling of the received feed gas by heat exchange with at least a portion of the second processed feed gas stream to produce cooled feed gas, one or more bulk separators for separating liquid components from the feed gas, and a conventional dehydration process downstream of the one or more bulk separators.

Clause 31. A cyclonic separator comprising a first inlet, a second inlet and being arranged for receiving at the first inlet the stream of a hydrogen sulfide containing feed gas, receiving at a distal end of the second inlet a flow of additive component, the additive component being a solvent for hydrogen sulfide;

the cyclonic separator further comprising an assembly to create a swirling motion of the stream within the cyclonic separator, wherein the cyclonic separator is further arranged for spraying from the second inlet the flow of additive component into the feed gas stream so as to form a mixture of sprayed additive and feed gas, and creating at a first outlet a first flow of a processed feed gas and at a second outlet a second flow of substantially hydrogen sulfide containing liquid, the processed feed gas having a second concentration of hydrogen sulfide, the second concentration being relatively lower than a first concentration of hydrogen sulfide of the feed gas received at the first inlet.

The invention claimed is:

1. A method for refining a feed gas comprising hydrocarbons and hydrogen sulfide having a first concentration of hydrogen sulfide, comprising:

producing a stream of a first processed feed gas, and producing a second stream of a second processed feed gas from the stream of the first processed feed gas, using a separation process for $H_2S$ removal by a cyclonic separator, wherein the cyclonic separator comprises a first inlet, a second inlet and is arranged for receiving at the first inlet the stream of first processed feed gas, receiving at a distal end of the second inlet a flow of additive component, the additive component being a solvent for hydrogen sulfide, spraying from the second inlet the flow of additive component into the first processed feed gas stream so as to form a mixture of sprayed additive and first processed feed gas, creating at a first outlet a first flow of the second processed feed gas and at a second outlet a second flow of substantially hydrogen sulfide containing liquid, the second processed feed gas having a second concentration of hydrogen sulfide, the second concentration being relatively lower than the concentration of hydrogen sulfide of the first processed feed gas, received at the first inlet, and wherein the additive component is a non-aqueous fluid which comprises as constituent one or more of the following chemical groups, i.e., an alcohol (e.g. methanol, ethanol), a diol, (e.g. ethylene glycol, dimethyl ether of polyethylene glycol), an ionic liquid, a dipolar aprotic solvent (e.g. Sulpholane).

2. The method according to claim 1, wherein the production of the stream of the first processed feed gas comprises removing hydrogen sulfide from the feed gas by a $H_2S$ bulk removal stage.

3. The method according to claim 1, wherein the cyclonic separator comprises in a housing a swirl inlet device comprising a pear-shaped central body which is arranged inside the housing coaxial to a central axis of the separator;

a space region being arranged in between the central body and the housing for an annular flow path, and wherein the second inlet is located at the periphery of the central body, so as to introduce the additive component into the annular flow path.

4. The method according to claim 3, comprising generating the spray of additive component in the annular flow path by the second inlet being arranged with at least one nozzle.

5. The method according to claim 4, wherein the at least one nozzle of the second inlet is located in a wall of the housing at the periphery of central body, for introduction of the additive component into the gas stream in a space region between the outer wall of the housing and the central body.

6. The method according to claim 4, wherein the at least one nozzle of the second inlet is located in a peripheral wall of the central body, for introduction of the additive component into the gas stream in a space region between the outer wall of the housing and the central body.

7. The method according to claim 4, wherein the cyclonic separator further comprises a tubular throat portion downstream of the central body, and the at least one nozzle of the second inlet is located on the downstream side of the central body, directed towards the tubular throat portion, in which position and direction of the second inlet substantially coincide with the central axis.

8. The method according to claim 1, wherein the additive component comprises as constituent at least one of a sulfolane and an ionic liquid.

9. The method according to claim 1, wherein the ionic liquid comprises at least one of a 1-butyl-3-methylimidazolium hexafluorophosphate and a 1-hexyl-3-methylimidazolium-bis(trifluoromethylsulfonyl)imide.

10. The method according to claim 1, comprising creating a spray with particle density of at least about $10^8/m^3$ by the second inlet.

11. The method according to claim 1, comprising creating by the second inlet spray particles with a size selected from one of a range from about 50 µm to about 0.2 µm, and a range from about 20 µm to about 1 µm.

12. The method according to claim 1, comprising the:
receiving by a liquid separator comprising a flow inlet, a first, second and third liquid outlet, at the flow inlet the second flow of a substantially hydrogen sulfide containing fluid;
separating the second flow of the substantially hydrogen sulfide containing fluid in a first, second and third component, the first component being second processed feed gas, the second component being a first liquid hydrogen sulfide and the third component being a mixture of liquid hydrogen sulfide mixed and additive component;
outputting at the first outlet the second processed feed gas to an outlet part;
outputting at the second outlet the first liquid hydrogen sulfide components to a drain part, and
outputting at the third outlet the mixture of liquid hydrogen sulfide and additive component.

13. The method according to claim 11, further comprising receiving by a further liquid separator the mixture of liquid hydrogen sulfide and additive component from the second liquid separator and
separating by the further liquid separator the additive component from the liquid hydrogen sulfide, the further liquid separator comprising an inlet for receiving the mixture of liquid hydrogen sulfide and additive component, a first outlet for outputting a flow of gaseous hydrogen sulfide components and a second outlet for outputting of additive component, the second outlet being connected to the second inlet of the cyclonic separator.

14. The method according to claim 12, further comprising:
in an oxidation unit, the oxidation unit having an inlet being connected to the first outlet of the further liquid separator and having an outlet being connected to the drain part:
receiving the flow of gaseous hydrogen sulfide components, oxidizing the gaseous hydrogen sulfide components into a mixture comprising sulfur and water and outputting the mixture comprising sulfur and water at the outlet.

15. The method according to claim 2, comprising in the $H_2S$ bulk removal stage:
receiving a stream of the feed gas and removing in a first separation process hydrogen sulfide from the feed gas for producing the stream of the first processed feed gas, and wherein the $H_2S$ bulk removal stage comprises a bulk removal stage cyclonic separator and a fractionation column; an outlet of the bulk removal stage cyclonic separator being connected to an intermediate inlet of the fractionation column, and
wherein the removal of $H_2S$ is carried out by a first sub-stage to separate first $H_2S$ containing condensables from a first stream portion of the feed gas by the bulk removal stage cyclonic separator and a second sub-stage of using the first $H_2S$ containing condensables as a water absorbing fluid of a second stream portion of the feed gas in the fractionation column, for producing the first processed feed gas.

16. The method according to claim 1, further comprising feeding the second processed gas stream to a final treatment stage comprising an adsorption tower using as an absorption fluid a non-aqueous solvent containing at least one of a 1-butyl-3-methylimidazolium hexafluorophosphate and a 1-hexyl-3-methylimidazolium-bis(trifluoromethylsulfonyl) imide.

* * * * *